April 18, 1944. W. S. WATTS 2,347,162
METHOD OF MAKING ICE CREAM SANDWICHES
Filed March 9, 1942
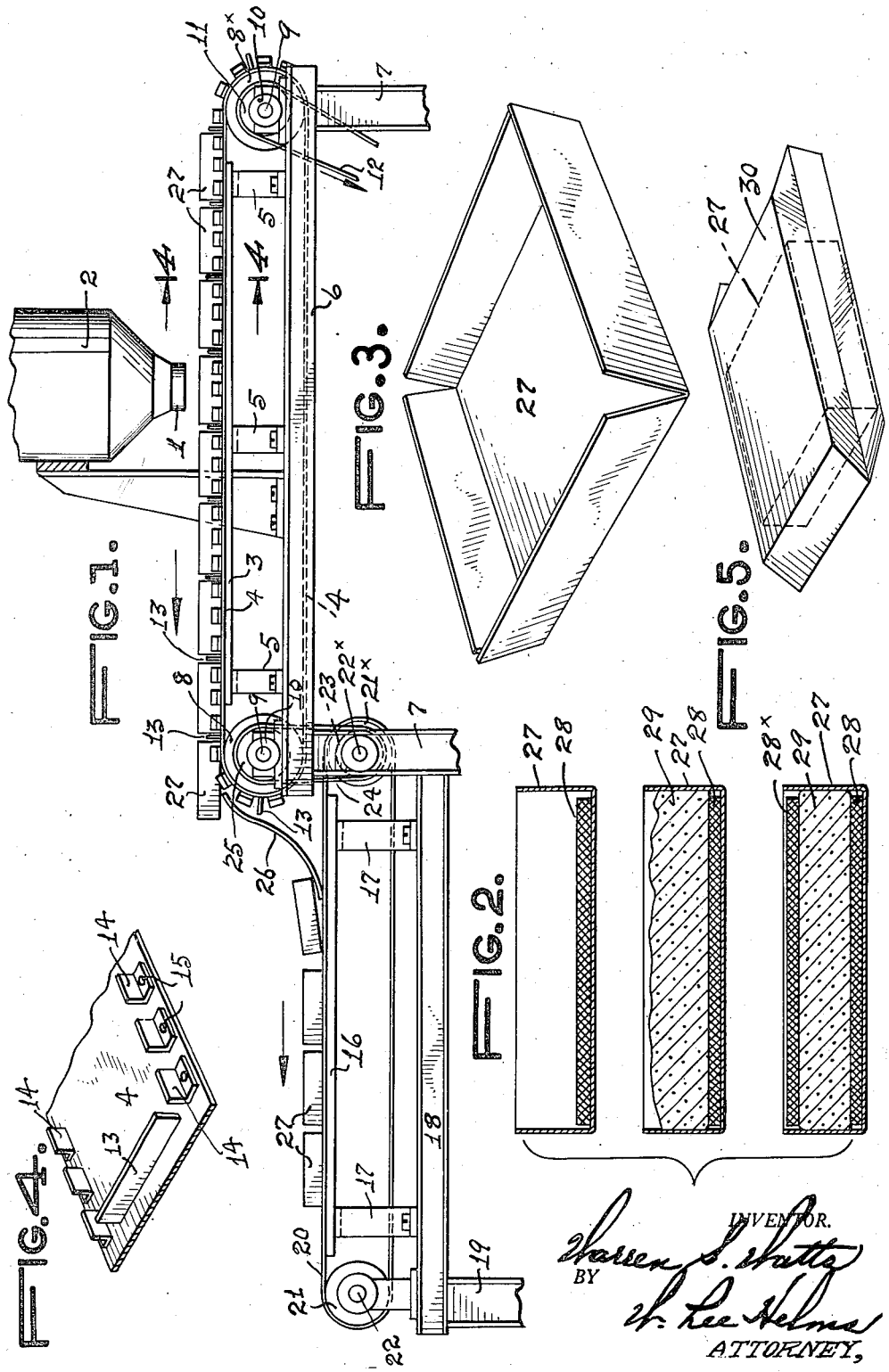

Patented Apr. 18, 1944

2,347,162

UNITED STATES PATENT OFFICE 2,347,162

METHOD OF MAKING ICE-CREAM SANDWICHES

Warren S. Watts, Montclair, N. J., assignor to Eskimo Pie Corporation, Bloomfield, N. J., a corporation of Delaware Application March 9, 1942, Serial No. 433,934

3 Claims. (Cl. 107—54)

Ice cream sandwiches consist of a central rectangular portion of ice cream having its upper and lower faces abutting and covered by a baked product such as a wafer. The present method of manufacturing the product is to flow an ice cream mix, generally partially frozen, into slab molds followed by hardening the molds after which the molds are defrosted, the ice cream slabs removed and the slabs sliced into a plurality of sandwich portions. These sandwich portions are then covered at the top and bottom, each by two of the cake wafers and the product is bagged ready for sale.

The above method involves a substantial number of operations and is slow. It is the specific object of this invention to produce ice cream sandwiches more rapidly and with the reduction of handling and greater sanitary protection, with increased speed and a substantially lower cost, so that a higher quality product may be marketed to the public at the same cost of the products of lesser quality now generally marketed. These and other objects of the invention will be described with reference to the accompanying drawing, in which:

Figure 1 is a diagrammatic view in front elevation showing an apparatus capable of carrying the method into effect.

Figure 2 is a composite view showing the three stages of filling the protecting paper mold liner and carrier.

Figure 3 is a perspective view showing a suitable type mold liner and carrier partially formed.

Figure 4 is a fragmentary section of the feeding belt taken on the line 4—4, Figure 1, looking in the direction of the arrows.

Figure 5 is a perspective view of the article (indicated by dotted lines) in a bag and ready for sale.

Referring to the drawing, I have shown in Figure 1 an ice cream discharge outlet 1 at the end of the chamber 2 which may be the continuation or outlet pipe of a freezer such as the well known creamery package or Vogt continuous freezers. Any suitable control for closing and opening the discharge outlet may be provided.

At 3 is a horizontal table over which is run a continuous belt 4. The table is supported by brackets 5 rising from a frame work comprising suitable horizontal members such as indicated at 6 and vertical standard 7. The belt is carried over drums or pulleys 8, 8x on shafts 9 rotating in suitable bearing members 10 and one of the shafts, shaft 9 in the present example, carries a pulley 11 driven by belt 12 from a suitable source of power. The exterior face of the belt is provided with a series of pockets now to be described.

In the present embodiment, each pocket comprises spaced walls 13 extending transversely of the belt and a plurality of wall members 14 extending longitudinally of the belt secured thereto in any suitable manner as by the rivets 15 which pass through horizontal flanges of the wall members 14.

At the discharge end of belt 4 and below the same is a second table 16 supported by brackets 17 from a frame comprising the horizontal member or members 18 and vertical supports such as 19 and 7. Running along the table is an endless belt 20 carried by pulleys 21, 21x mounted on shafts 22, 22x. Shaft 22x carries a pulley 23 driven by a belt 24 which leads upward to a pulley 25 on shaft 9.

Intermediate the discharge end of belt 4 and the receiving area of belt 20 is a downwardly extending, and preferably curved, slide plate 26.

In the operation of my method, light-weight paper board trays, or scored and cut-out blanks of paper board, either waxed or unwaxed, shown in Figure 3 (that figure showing the liner only partly formed) are depressed into the successive pockets formed by members 13 and 14 as belt 4 moves toward the ice cream discharge outlet 1. These liners may be substituted by pre-formed box trays, if desired. As each liner reaches the ice cream discharge outlet 1 the pre-formed trays or liners are filled with ice cream, but before such filling an operator places in the bottom of the tray or liner a suitable cake wafer. The tray or liner is generally indicated at 27 and the initial cake wafer indicated at 28. The tray or liner containing the initial cake wafer 28 and the ice cream 29 then will have the appearance shown in the diagrammatic cross section shown at the center of the schematic view, Figure 2.

When the successive trays or liners pass the ice cream filling unit as they move in the direction of the arrow, Figure 1, an operator will place a top cake wafer 28x on the top surface of the ice cream. In the continued movement of the articles, they will reach the end of the feed belt at which the slide plate 26 is located, and at this point the foremost of the guide walls 13, 14, will move downwardly away from the articles as they successively reach such point, in the manner shown in Figure 1. The continued movement of belt 4 will cause each article to be moved downwardly upon the slide plate and the articles will descend upon belt 20. From belt 20 the articles may be removed and placed in bags such as indicated at 30, Figure 5, the bags packed in cartons and the cartons removed to a hardening room. Thus the trays or liners form the dual purpose of a mold to conform the ice cream to the shape desired, and a carrier to the ultimate consumer.

The semi-plastic ice cream has, in such state, an adhesive characteristic. It is not entirely a free flowing plastic but tends to conform and adhere to the paper tray into which it is discharged. For this reason, the liner 27 may have disconnected upwardly extending walls, as illustrated, and yet when the articles pass upon belt 20 their form will be maintained pending final and intense refrigeration in the usual hardening room. By reason of the fact that the liner illustrated in Figure 3 has disconnected upwardly extending walls, and the tray perforated connected walls, the final hardened product may be released by stripping down those walls prior to consumption of the ice cream sandwich. If cardboard or heavy paper trays with connected side walls are employed, I prefer that the walls be perforated for ready separation from the ice cream sandwich.

My method makes use of the adhesive characteristics and tendency to pre-form, and retain form of semi-plastic ice cream until frozen to a substantially solid state and which under slight restraint will be satisfactorily held by a liner such as shown in Figure 3. The liner and its contents are held in restraint and in form by the pocket walls 13, 14, for a sufficient time to afford a slight settling and conforming of the semi-plastic and minor adhesion to the side walls of the liner, so that by the time the ice cream sandwich is passed upon belt 20 it may be picked up and bagged preliminary to hardening.

My method and apparatus enables great speed of production with simplicity in the mechanical elements and each unit may be rapidly operated by three operators, one at each side of the ice cream discharge outlet for inserting the cake wafers, and one at belt 20 for bagging. As stated hereinabove, the speed of production and its cost constitutes great improvement over the method of production now in general use.

A modification of the method is employed when it is desired that thin wafers of chocolate be used instead of the baked cake-like wafer 28. Thus the tray-like liners 27 may be initially subjected to low temperature in the usual hardening room or other refrigeration temperature so as to be chilled. Either prior to or after applying the trays to the pockets of the carrier belt, a measured quantity of high content cocoa butter chocolate, somewhat sweetened, will be poured in each tray, the cholocate quickly settling into uniform thickness and rapidly solidifying due to the absorption of heat therefrom by the chilled trays or in a chilled atmosphere. Promptly thereafter the trays will move under the discharge outlet 1 of the chamber 2 holding the plastic and yet flowable ice cream and the tray will receive its predetermined discharge of ice cream, filling the tray to within approximately ⅛ of an inch of the top of the tray. On top of the exposed side of the ice cream, there will be deposited as by pouring, the same kind of high-content cocoa butter chocolate to form a chocolate wafer or layer similar in thickness and consistency to the initial layer. In such modified method, I prefer that the trays be waxed, at least on their inner surfaces, so as to be readily freed by the consumer from the composite sandwich of ice cream and chocolate wafers formed therein by the method. The chocolate preparation employed has preferably a relatively high content of cocoa butter so that it will be solid at normal room temperatures and will be quickly solidified under the subnormal temperature of the trays, and/or the ice cream with which same are in direct contact. Such chocolate preparations are well known in the ice cream and confectionery fields, and usually have a melting point above 90° F.

Having described my invention, what I claim and desire to secure by Letters Patent, is as follows:

1. A method of manufacturing a product which consists of upper and lower edible wafers, an intermediate block of a frozen confection, and a thin-walled cellulosic molding member adapted to carry the edible portion of the product and to be stripped therefrom by the consumer, which method consists in flowing a supply of fluid partially frozen confection material of a nature exemplified by an ice cream mix into the thin-walled cellulosic member after placing an edible wafer in said molding member, the flow being continued until the frozen confection material partially fills the molding member, placing an edible wafer in the molding member over the ice cream confection and subjecting the product to hardening by intense refrigeration, whereby the hardened frozen confection block and the edible wafers bonded thereto by the intense refrigeration will enable manual stripping away of the cellulosic molding member.

2. A method of manufacturing a product comprising an edible portion consisting of a block of frozen confection material and wafer-like layers of hard chocolate bonded to its major faces, and a cellulosic tray-like molding carrier for the edible portion and adapted to be stripped therefrom by the consumer when the edible portion is hardened, which comprises forming a chocolate wafer in a cooled cellulosic molding carrier by flowing therein a chocolate preparation rendered fluid by heat and solidifying at normal room temperature, the chocolate thereby being rapidly solidified, partially filling the molding carrier with a frozen confection material of a nature exemplified by an ice cream mix, forming a chocolate wafer-cover for the frozen confection by flowing thereon a chocolate preparation having melting and solidification points similar to the first named chocolate preparation, and subjecting each of the edible constituents to hardening by intense refrigeration and to the point where the cellulosic molding carrier may be stripped away.

3. A method of manufacturing a product which consists of upper and lower edible wafers, an intermediate block of a frozen confection, and a thin-walled cellulosic molding member adapted to carry the edible portion of the product and to be stripped therefrom by the consumer, which method consists in flowing a predetermined amount of an edible compound rendered fluid by heat and capable of solidifying at about normal room temperature until said flow forms a layer of wafer thickness in the cellulosic molding member, partially filling the cellulosic molding member with a fluid partially frozen confection of a nature exemplified by an ice cream mix, forming an edible wafer-cover for the frozen confection by flowing thereon an edible compound rendered fluid by heat and having a solidification point similar to the first named layer-forming compound, and subjecting each of the edible constituents of the product to hardening by intense refrigeration and to the point where the thin-walled cellulosic molding member may be stripped away.

WARREN S. WATTS.